United States Patent [19]

Namiki

[11] 4,207,980
[45] Jun. 17, 1980

[54] SLIDE FILE SHEET
[75] Inventor: Naokuni Namiki, Hoya, Japan
[73] Assignee: Slidex Corporation, Tokyo, Japan
[21] Appl. No.: 14,152
[22] Filed: Feb. 22, 1979
[30] Foreign Application Priority Data
  Mar. 1, 1978 [JP] Japan ............................ 53-24614[U]
[51] Int. Cl.² .......................... B65D 1/36; B65D 85/48
[52] U.S. Cl. ..................................... 206/456; 206/564
[58] Field of Search ............... 206/456, 455, 564, 565; 34/238; 220/20, 21

[56] References Cited
U.S. PATENT DOCUMENTS

| | | | |
|---|---|---|---|
| 2,941,663 | 6/1960 | Ettlinger, Jr. | 206/565 |
| 2,968,882 | 1/1961 | Ozeki | 206/456 |
| 3,802,555 | 4/1974 | Grasty et al. | 206/564 |
| 4,085,845 | 4/1978 | Perfect | 206/564 |

*Primary Examiner*—William T. Dixson, Jr.
*Attorney, Agent, or Firm*—Fleit & Jacobson

[57] ABSTRACT

A slide file sheet includes a plurality of rectangular recesses formed by longitudinally and traversely extending bounding walls for arranging a plurality of slide films therein and holding lugs extending from side walls of the bounding walls inwardly of the rectangular recesses for holding the slide films.

The file sheet according to the invention comprises first draft channels formed in the bounding walls and in support portions for supporting mounts of the slide films for communicating the spaces on the upper surfaces of the slide films with those on the lower surfaces of the films, and second draft channels formed in the support portions for communicating the spaces on the lower surfaces of the films with punched openings below the holding lugs when the slide films are held within the rectangular recesses.

In projecting the slide films arranged and held in the file sheet by the use of a projector, the first and second draft channels cause the air to flow through these channels to cool the films, thereby preventing the deformation and discoloration of the films, which would otherwise occur due to radiation heating of a light source of the projector, thereby always providing clear images on a screen.

11 Claims, 4 Drawing Figures

SLIDE FILE SHEET

BACKGROUND OF THE INVENTION (1) Field of the Invention

The present invention relates to a slide file sheet for arranging and holding a plurality of slide films in a plane.

(2) Description of the Prior Art

Such slide file sheets have been effectively used to arrange and store a great number of slide films. Particularly, they have been conveniently used to project film images by slidingly moving in parallel directions and in perpendicular directions thereto in a plane the file sheets with the slide films arranged therein on an overhead projector without intermitting the projection.

In general, such slide file sheets comprise a plurality of rectangular recesses defined by a number of crossing bounding walls and holding lugs inwardly projecting from a pair of opposite walls of the each rectangular recess for holding a slide film received therein. In projecting the slide films arranged and held in these file sheets by the use of a projector, the air trapped between bottom walls of the recesses and the slide films and their mounts or paper frames is likely to be heated to as high as approximately 80° C. by the radiation heating from the light source of the projector. Such a heating tends to deform and discolor the slide films to produce dull images on a screen.

SUMMARY OF THE INVENTION

It is an object of the present invention to overcome the above described difficulty in the prior art and to provide an improved slide file sheet capable of flowing the air from the upper side to the lower side of the file sheet and vice versa to prevent the deformation and discoloration of the films caused by the undue heating of a light source of a projector thereby always obtaining clear images on a screen.

The invention will be more fully understood by referring to the following detailed specification and claims taken in connection with the appended drawings.

DESCRIPTION OF THE PREFERRED EMBODIMENT

Figure 1:
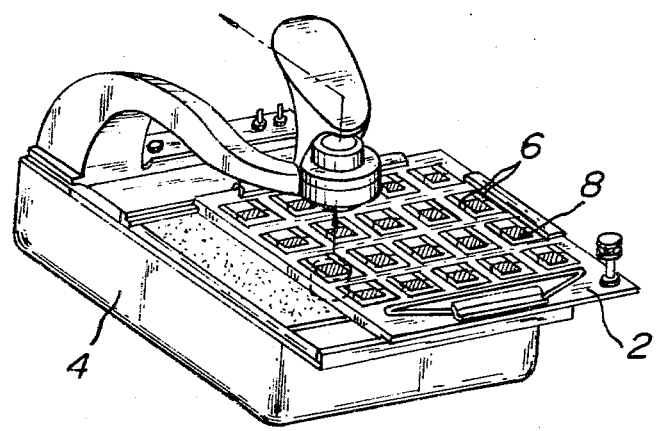
FIG. 1 is a perspective view of an overhead projector using a slide file sheet of a prior art.

Referring to FIG. 1 illustrating a slide file sheet 2 of the prior art used for an overhead projector 4, the slide file sheet 2 made of a transparent plastic material comprises a plurality of rectangular recesses defined by a number of crossing bounding walls and holding lugs 6 inwardly projecting from a pair of opposite walls of the each rectangular recess for holding a slide film 8 received therein. In projecting these slide films 8 arranged and held in this slide file sheet 2 by the use of the projector, the air trapped between bottom walls of the recesses and the slide films and their mounts or paper frames tends to be heated to as high as approximately 80° C. by the radiation heating from the light source of the projector. Such a heating deforms and fades or discolors the slide films to produce dull images on a screen.

Figure 2:
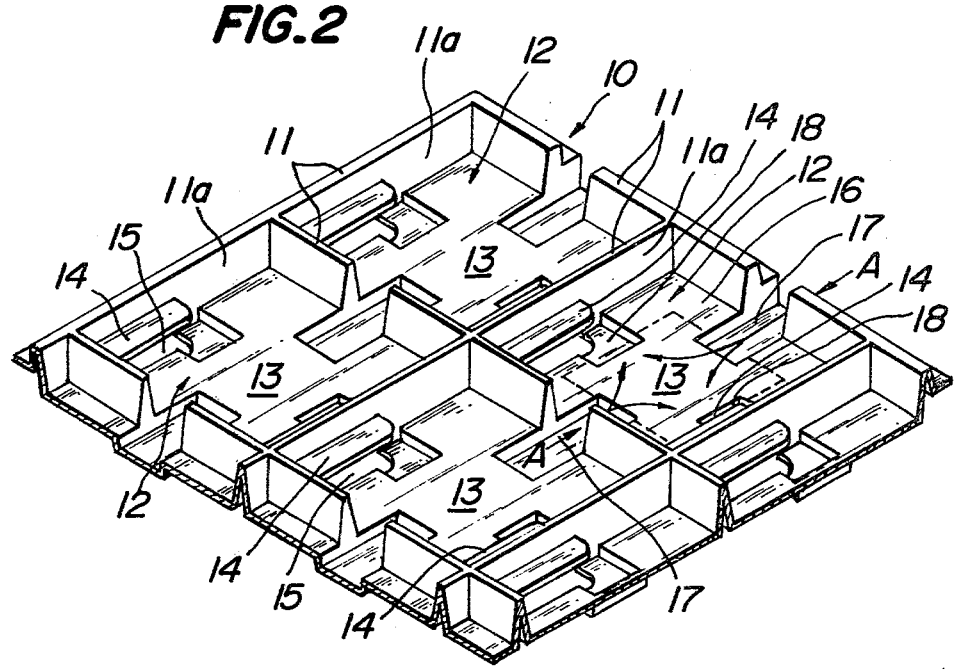
FIG. 2 is a perspective view of a preferred embodiment of the file sheet according to the invention.

Referring to FIG. 2 showing one preferred embodiment of a plastic slide file sheet according to the invention, the file sheet 10 comprises bounding walls 11 extending in the longitudinal and traverse directions at respective constant intervals, a plurality of rectangular recesses 12 having bottom walls 13 defined by the bounding walls 11 and aligned with each other in the longitudinal and traverse directions, holding lugs 14 formed by punching the bottom walls 13 leaving punched openings 15 and extending inwardly of the rectangular recesses from pairs of opposite side walls 11a of the bounding walls.

With this slide file sheet 10, peripheral portions of the bottom walls 13 of the recesses 12 form support portions 16 (outwardly of broken lines of the bottom walls in FIG. 2) for supporting mounts or paper frames of slide films.

With slide file sheets of the prior art, the air between bottom walls and slide films with their mounts is likely to be heated by the radiation heating from a light source system to a high temperature such as approximately 80° C. In order to prevent the air from being heated by the light source, according to the invention there are provided in the rectangular recesses 12 of the file sheet 10 with first vent or draft channels or grooves 17 passing through the support portions 16 and the bounding walls 11 other than the bounding walls having the holding lugs 14 and second vent or draft channels 18 passing through the support portions 16 and merging into the punched openings 15. The first draft channels 17 cause the spaces on the upper and lower surfaces of the slide films received in the file sheet to communicate to each other and the second draft channels 18 cause the spaces on the lower surfaces of the slide films to communicate with the punched openings 15, thereby enabling the air to pass from spaces on the upper side to the lower side of the file sheet and vice versa.

With this embodiment of FIG. 2, a pair of two opposite bounding walls include two first draft channels which are respectively formed in the bounding walls. However, so long as the air is permitted to pass through these channels to achieve the effect of the present invention, one or three or more channels may be provided. In the former case, the channels are formed in every other bounding walls. Any depths, widths and positions of the first channels 17 may be selected as the case may be. On the other hand, it is preferable to extend the channels 17 somewhat inwardly of the support portions 16 as shown in FIG. 2 in order to accomplish the complete communication of the air about the slide films. Any depths, widths and positions of the second channels 18 may of course be selected as in the first channels 17.

Figure 3:
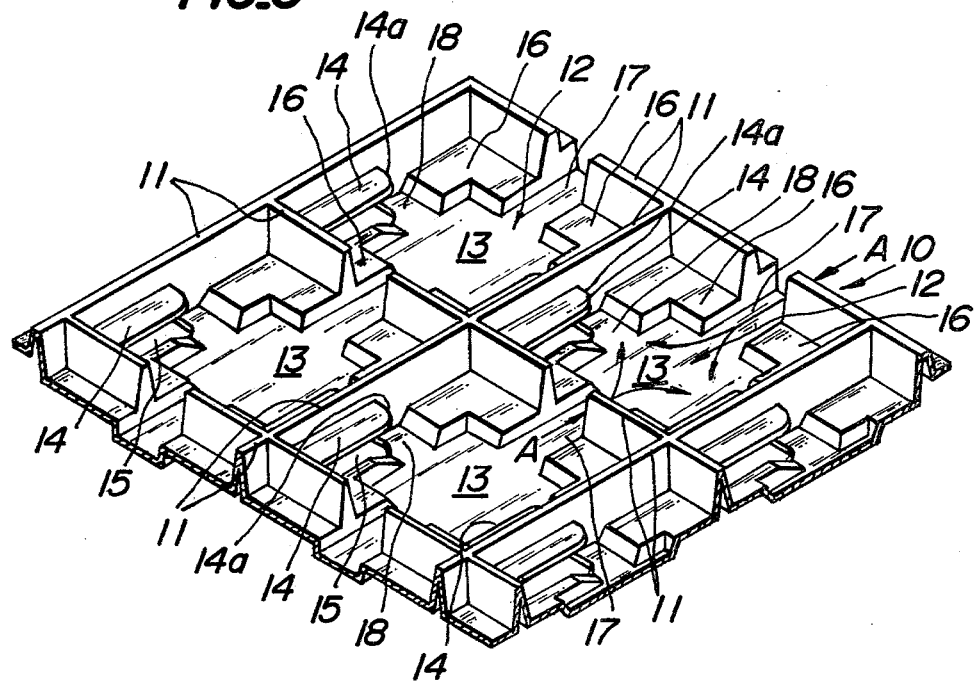
FIG. 3 is a perspective view of another preferred embodiment of the file sheet according to the invention.

FIG. 3 illustrates another embodiment of the file sheet of transparent or translucent plastic material, wherein support portions 16 are raised or protrude higher above the bottom walls 13. This file sheet achieves the air flowing from the upper sides to the lower sides of the sheet or vice versa with the aid of first and second draft channels 17 and 18.

With this embodiment, the air is permitted to flow sufficiently without extending the first channels 17 inwardly of the support portions 16.

The first channels 17 extend completely across the bounding walls 11 in FIG. 3. The first channels 17 may extend only in part of the support portions and bounding walls. Moreover, the support portions 16 may be spaced apart from the bounding walls 11. In this case, the first channels 17 extend only in the support portions 16 to cause the air to flow into and from the spaces between the side faces of the bounding walls and mounts of the slide films.

Any depths and widths and positions of the first and second channels 17 and 18 may be selected as in the embodiment in FIG. 2. Particularly, the second channels 18 are provided in the proximities in opposition to the tips 14a of the holding lugs 14 and formed in the form of an inverted-trapezium in section, so that ends of the slide films or their paper frames are readily inserted under the holding lugs 14 when the films are arranged in the rectangular recesses 12 of the file sheet.

With these embodiments, particularly the file sheet shown in FIG. 3, films without mounts as well as those with mounts can be securely held between the support portions 16 and holding lugs 14 in the rectangular recesses 12 to communicate the spaces under the slide films with the atmosphere.

Figure 4:
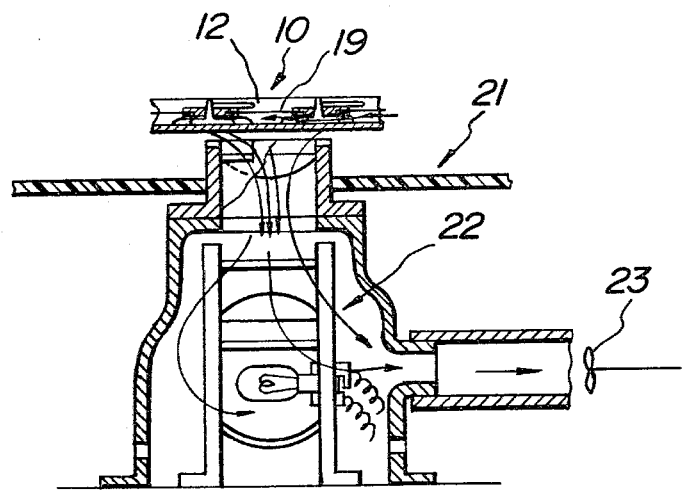
FIG. 4 is a partial sectional view showing an application of the file sheet according to the invention.

In order to more effectively achieve this purpose, when a slide file sheet 10 holding a plurality of aligned slide films 19 is used for projecting film images, a cooling device 23 for a light source system 22 of a projector 21 is provided to force the air to flow from the space under the file sheet 10 as well as the spaces in the rectangular recesses immediately above the light source system as shown by arrows in FIG. 4.

The cooling device as a suction fan exemplarily shown in FIG. 4 causes the air to flow from the first channels 17 as shown in arrows A by FIGS. 2 and 3 through the second channels 18 and the punched openings 15 into the cooling device 23. In substitution for the suction fan an air blower may be used which will also achieve a sufficient cooling although the flowing direction of the air is reverse. Furthermore, without using these cooling devices, the air is fed against the films from the location of an arm member supporting a projector lens to cause the air to flow from the upper side to the lower side of the slide file sheet 10 for the purpose of cooling the slide films.

As can be seen from the above explanation, the slide file sheet comprising draft channels according to the invention can prevent the deformation and discoloration of films to obtain clear images on a screen.

It is understood by those skilled in the art that the foregoing description discloses the preferred embodiments of the invention and that various changes and modifications may be made in the invention without departing from the spirit and scope thereof.

What is claimed is:

1. In a slide file sheet for arranging and holding a plurality of slide films, said file sheet including a plurality of rectangular recesses formed by a bottom wall cooperating with longitudinally and traversely extending bounding walls, and holding lugs extending from side walls of said bounding walls inwardly of said rectangular recesses, the improvement comprising means for supporting lower surfaces of slide films positioned in said slide recesses, said supporting means having first portions for contacting and supporting portions of said slide films and second portions positioned beneath and spaced from said slide films and defining therewith spaces beneath lower surfaces of said slide films; first draft channels for establishing communication between spaces above upper surfaces of said slide films and the spaces beneath lower surfaces of the films; and second draft channels for establishing communication between said spaces beneath the lower surfaces of the films and punched openings extending through said bottom wall below said holding lugs when said slide films are held within said rectangular recesses.

2. A slide file sheet as set forth in claim 1, wherein said first draft channels are provided in said bounding walls and said first portions of said means for supporting include support portions for supporting mounts of said slide films, said second draft channels being provided in said support portions.

3. A slide file sheet as set forth in claim 2, wherein a pair of two opposite bounding walls include two said first draft channels which are respectively formed in the bounding walls.

4. A slide file sheet as set forth in claim 2, wherein a pair of two opposite bounding walls include only one said first draft channel.

5. A slide file sheet as set forth in claim 2, wherein a pair of two opposite bounding walls include at least three said first draft channels.

6. A slide file sheet as set forth in claim 2, wherein said first draft channels extend somewhat inwardly of said support portions.

7. A slide file sheet as set forth in claim 2, wherein said support portions are raised above bottom walls of said rectangular recesses.

8. A slide file sheet as set forth in claim 7, wherein said first channels extend only in part of the support portions and bounding walls.

9. A slide file sheet as set forth in claim 7, wherein said support portions are spaced apart from said bounding walls and said first channels extend only in the support portions.

10. A slide file sheet as set forth in claim 7, wherein said second channels are provided in the proximities in opposition to tips of said holding lugs and formed in an inverted-trapezium in section.

11. A slide file sheet as set forth in Claim 1, wherein said first portions of said means for supporting includes support portions spaced apart from said bounding walls and raised above said bottom walls of said rectangular recesses, said first and second channels being formed in said support portions.

* * * * *